US011879600B2

(12) United States Patent
Ansems et al.

(10) Patent No.: US 11,879,600 B2
(45) Date of Patent: Jan. 23, 2024

(54) LED FILAMENT LAMP

(71) Applicant: SIGNIFY HOLDING B.V., Eindhoven (NL)

(72) Inventors: Johannes Petrus Maria Ansems, Hulsel (NL); Michel Cornelis Josephus Marie Vissenberg, Roermond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/776,719

(22) PCT Filed: Nov. 16, 2020

(86) PCT No.: PCT/EP2020/082250
§ 371 (c)(1),
(2) Date: May 13, 2022

(87) PCT Pub. No.: WO2021/099262
PCT Pub. Date: May 27, 2021

(65) Prior Publication Data

US 2022/0390075 A1 Dec. 8, 2022

(30) Foreign Application Priority Data

Nov. 18, 2019 (EP) .................................... 19209696

(51) Int. Cl.
*F21K 9/232* (2016.01)
*F21K 9/237* (2016.01)

(52) U.S. Cl.
CPC .............. *F21K 9/232* (2016.08); *F21K 9/237* (2016.08)

(58) Field of Classification Search
CPC ........... F21K 9/232; F21K 9/237; F21V 3/049
See application file for complete search history.

(56) References Cited

U.S. PATENT DOCUMENTS

| | | | |
|---|---|---|---|
| 5,363,009 | A | 11/1994 | Monto |
| 8,953,926 | B1 | 2/2015 | Kelly et al. |
| 10,036,517 | B2 | 7/2018 | Johnston et al. |
| 10,161,593 | B2 | 12/2018 | Bennett et al. |
| 2011/0141747 | A1 | 6/2011 | Biar |
| 2012/0092852 | A1 | 4/2012 | Doan et al. |
| 2012/0195046 | A1 | 8/2012 | Wang et al. |

(Continued)

FOREIGN PATENT DOCUMENTS

| | | | |
|---|---|---|---|
| CN | 205137154 | U | 4/2016 |
| EP | 2677231 | A1 | 12/2013 |

*Primary Examiner* — Karabi Guharay

(57) ABSTRACT

It is an object of the invention to provide an improved LED filament lamp (10), the LED filament lamp (10) comprising: a transparent envelope (11) provided with a transparent optical structure (12); at least one LED filament (14) enclosed by the transparent envelope (11); wherein the transparent optical structure (12) comprises a plurality of individually spaced prismatic grooves (17) and/or ridges that are at least partly aligned along a projection of the at least one LED filament (14) on the transparent envelope (11); wherein each prismatic groove (17) and/or ridge of the plurality of individually spaced prismatic grooves (17) and/or ridges comprises a refractive facet (171) oriented at a wedge angle (172) between 5 and 50 degrees with a tangent of the envelope (11) at the location of the respective prismatic groove (17) and/or ridge.

15 Claims, 3 Drawing Sheets

(56) References Cited

U.S. PATENT DOCUMENTS

| | | | | |
|---|---|---|---|---|
| 2013/0083551 | A1 | 4/2013 | Watanabe et al. | |
| 2013/0294071 | A1 | 11/2013 | Bomgaarden et al. | |
| 2014/0119007 | A1 * | 5/2014 | Edmond | F21V 3/10 362/235 |
| 2016/0290594 | A1 | 10/2016 | Thijssen et al. | |
| 2019/0113181 | A1 | 4/2019 | Schlereth et al. | |

* cited by examiner

LED FILAMENT LAMP

CROSS-REFERENCE TO PRIOR APPLICATIONS

This application is the U.S. National Phase application under 35 U.S.C. §371 of International Application No. PCT/EP2020/082250, filed on Nov. 16, 2020, which claims the benefit of European Patent Application No. 19209696.4, filed on Nov. 18, 2019. These applications are hereby incorporated by reference herein.

FIELD OF THE INVENTION

The invention relates to a LED (light-emitting diode) filament lamp, wherein the LED filament lamp comprises a transparent envelope provided with a transparent optical structure comprising refractive optical elements. The invention further relates to a luminaire comprising a socket and such a LED filament lamp. The invention further relates to a method of providing a transparent optical structure to a transparent envelope of such a LED filament lamp.

BACKGROUND OF THE INVENTION

Incandescent lamps are increasingly being replaced by LED based lighting solutions. However, many users still enjoy the appearance of incandescent lamps, e.g. due to their highly decorative look, but at the same time still want to enjoy the benefits provided by LED based lamps and lighting. Therefore, one may make use of the infrastructure for producing incandescent lamps based on glass bulbs and replace the (conventional) filament with a LED filament; hence rendering a LED filament lamp. The LED filament(s) may thereby be connected to a module comprising electrical wiring and/or a power supply.

Such LED filament lamps are often able to produce the intended effect of resembling the appearance of an incandescent lamp when the LED filament(s) are operated to emit light having a relatively low intensity. However, partly because of the lower power consumption of LED based lighting, there is a trend towards a higher lumen output per LED filament lamp. Therefore, due to the ongoing increase in intensity of the light emitted by the LED filament(s), the light emitted by the LED filament lamp may produce an uncomfortable glare for a viewer. This is a clear disadvantage.

To reduce such glare, the (bulb) envelope of a LED filament lamp may be frosted or textured to hide the filaments from direct view. While this may solve the glare issue, it also takes away the decorative appearance of a clear filament bulb; hence eliminating the transparency and very character of a LED filament lamp.

SUMMARY OF THE INVENTION

It is an object of the invention to provide an improved LED filament lamp, which at least alleviates the problems and disadvantages mentioned above. Thereto, the invention provides a LED filament lamp comprising: a transparent envelope provided with a transparent optical structure; at least one LED filament enclosed by the transparent envelope; wherein the transparent optical structure comprises a plurality of individually spaced prismatic grooves and/or ridges that are at least partly aligned along a projection of the at least one LED filament on the transparent envelope; wherein each prismatic groove and/or ridge of the plurality of individually spaced prismatic grooves and/or ridges comprises a refractive facet oriented at a wedge angle between 5 and 50 degrees with a tangent of the envelope at the location of the respective prismatic groove and/or ridge.

Said LED filament lamp comprises a transparent envelope provided with a transparent optical structure. The at least one LED filament is arranged within the transparent envelope. Therefore, the at least one LED filament is visible within the envelope and renders the characterizing appearance of an incandescent lamp while providing the technical advantages of a LED lamp.

Moreover, the transparent optical structure comprises a plurality of prismatic grooves and/or ridges. Said plurality of grooves and/or ridges are individually spaced and at least partly aligned along a projection of the at least one LED filament on the transparent envelope. Additionally, each prismatic groove and/or ridge comprises a refractive facet (or: plane). The refractive facet is oriented at a wedge angle between 5 and 50 degrees with a tangent of the envelope at the location of the respective prismatic groove and/or ridge. Said prismatic grooves and/or ridges are therefore refractive. Hence, due to the very combination of these features, said plurality of individually spaced prismatic grooves and/or ridges provides a refractive optical effect of the light emanating from the at least one LED, instead of providing for example an effect based on total internal reflection (TIR).

More specifically: The plurality of prismatic grooves and/or ridges, which are provided to the transparent envelope, deflect a fraction of the light emanating from the at least one LED filament to create a displaced virtual image(s) of the at least one LED filament. Considering the relative prism area to be 'P' and the luminance of a LED filament being 'L', the transparent envelope provided with the transparent optical structure according to the invention will render a luminance of $(1-P)*L$ for the at least one LED filament arranged within the transparent envelope, and a luminance of $P*L$ for said virtual image of the at least one LED filament. Therefore, by redistributing the luminance of the at least one LED filament over a larger surface area, the perceived brightness and hence the glare of the LED filament lamp is advantageously reduced without reducing the light output of the LED filament lamp.

According to the invention, an individually spaced prismatic groove and/or ridge may either be symmetrical or asymmetrical. The asymmetrical individually spaced prismatic groove and/or ridge may thereby render only one virtual image, whereas the symmetrical individually spaced prismatic groove and/or ridge may render two virtual images. In both cases the refractive facet may be oriented at a wedge angle between 5 and 50 degrees with a tangent of the envelope at the location of the respective prismatic groove and/or ridge, thereby ensuring refraction of light.

The spaces between the plurality of prismatic grooves and/or ridges may be flat, hence only slightly displacing the image of a LED filament and consequently not considered to render a displaced virtual image according to the invention. Moreover, having no space between said plurality of prismatic grooves and/or ridges may render a totally diffusive optic, which eliminates the very characteristic appearance of a LED filament lamp, and merely becomes a diffusive LED lamp in which no individual filament may be recognized.

In aspects, the transparent envelope may at least partly be transparent. For example, a top and/or neck part of the envelope of the LED filament lamp may e.g. be translucent.

In an embodiment, the wedge angle may be between 10 and 40 degrees, preferably between 20 and 30 degrees. Such a wedge angle between 10 and 40 degrees or between 20 and 30 degrees may be preferred, because the plurality of individually spaced prismatic grooves and/or ridges may enhance the refractive optical effect caused.

In an embodiment, at least two of the plurality of individually spaced prismatic grooves and/or ridges may comprise a different wedge angle. Such an embodiment may be advantageous for providing more variety in the virtual images rendered by the transparent optical structure.

Furthermore, in an embodiment, the transparent optical structure may cover less than half of the transparent envelope, (preferably) less than a third of the transparent envelope, or (more preferably) less than a tenth of the transparent envelope. Because less than half of the transparent envelope is covered by the transparent optical structure, the direct view on the at least one LED filament remains the dominant image when looking at the LED filament lamp. This applies similarly, but to a more advantageous degree, to the examples wherein less than a third or less than a tenth of the transparent envelope is covered by the transparent optical structure.

Said embodiment may also be phrased as: The transparent optical structure covers less than half of a complete surface area of the transparent envelope, (preferably) less than a third of the complete surface area of the transparent envelope, or (more preferably) less than a tenth of the complete surface area of the transparent envelope. Said embodiment may also be phrased as: a total surface area of the transparent envelope may be covered in part by the transparent optical, said part being less than half, less than a third, or less than a tenth of the total surface area of the transparent envelope.

The individual spacing of the prismatic grooves and/or ridges may be consistent. Hence, in an embodiment, the plurality of prismatic grooves and/or ridges may be individually spaced with a fixed pitch; wherein said fixed pitch may be defined as the shortest distance along the envelope between neighboring tops of the plurality of individually spaced prismatic grooves and/or ridges.

In an embodiment, each prismatic groove and/or ridge of the plurality of individually spaced prismatic grooves and/or ridges may comprise a base width between 0.01 and 0.9 millimeter, preferably between 0.05 and 0.5 millimeter. Said base width may be phrased as a base width of a prism. Such a width between 0.01 and 0.9 millimeter, and preferably between 0.05 and 0.5 millimeter, may e.g. be typical for rendering said refractive optical effect according to the invention. In a further embodiment, at least two of the plurality of individually spaced prismatic grooves and/or ridges may comprise a different base width. Such an embodiment may reduce the perception of glare even further, since the plurality of individually spaced prismatic grooves and/or ridges may render multiple virtual images corresponding to the respective at least one LED filament.

In an embodiment, each prismatic groove and/or ridge of the plurality of individually spaced prismatic grooves and/or ridges may comprise an equal base width. Hence, the prismatic grooves and/or ridges may comprise an equal shape. This may e.g. facilitate manufacturing of the LED filament lamp.

Moreover, in a further embodiment, the plurality of prismatic grooves and/or ridges may be individually spaced with a fixed pitch equal to at least one of: two times the equal base width, at least three times the equal base width, at least four times the equal base width, at least five times the equal base width, or at least ten times the equal base width; wherein said fixed pitch may be defined as the shortest distance along the envelope between neighboring tops of the plurality of individually spaced prismatic grooves and/or ridges.

In an embodiment, the plurality of individually spaced prismatic grooves and/or ridges are distributed evenly along a circumference of the transparent envelope. Such an embodiment may be advantageous in creating a uniform light output and/or appearance of the LED filament lamp.

In an embodiment, the transparent envelope may comprise an inner envelope surface and an outer envelope surface, wherein the transparent optical structure may be provided on the inner envelope surface, on the outer envelope surface, and/or between the inner envelope surface and the outer envelope surface. The inner envelope surface may be the surface of the transparent envelope directed inwards towards the at least one LED filament. The outer envelope surface may be the surface of the transparent envelope directed outwards away from the at least one LED filament.

The transparent optical structure may be provided on the inner surface of the transparent envelope; hence the plurality of individually spaced prismatic grooves and/or ridges that are partly aligned along a projection of the at least one LED filament on the respective inner surface of the transparent envelope may be provided to said inner surface. Such an embodiment may provide advantages in manufacturing said LED filament lamp, and/or allow the outer surface of the transparent envelope to remain smooth.

Additionally or alternatively, the transparent optical structure may be provided on the outer surface of the transparent envelope; hence the plurality of individually spaced prismatic grooves and/or ridges that are partly aligned along a projection of the at least one LED filament on the respective outer surface of the transparent envelope may be provided to said outer surface. Such an embodiment may provide advantages in manufacturing said LED filament lamp, e.g. the transparent envelope may be produced first, and the transparent optical structure may be associated with the outer surface of the transparent envelope later.

Additionally or alternatively, the transparent optical structure may be provided in the transparent envelope, i.e. between the inner envelope surface and the outer envelope surface; hence the plurality of individually spaced prismatic grooves and/or ridges that are partly aligned along a projection of the at least one LED filament on the transparent envelope may be provided as integrated part of the transparent envelope. Such an embodiment may provide advantages in manufacturing said LED filament lamp, e.g. the transparent envelope and transparent optical structure may e.g. be made with a single process from e.g. a single material. Techniques such as 3D-printing, or photolithography or 2K-injection molding may apply.

Thus, the transparent optical structure may be provided on the inner surface or at the outer surface of the transparent envelope, depending on e.g. the material and/or production technology, though the outer surface of the transparent envelope is usually easier to structure. It can be made through a structure in the mold of a plastic or glass bulb; as a post processed structure; or coating (e.g. imprinting or etching or photolithography); or as a separate sleeve (e.g. made of silicone) or rigid cylinder that may be pulled over a lamp as an accessory.

Said dimensions, as mentioned above, may for example also be dependent on the material of the transparent optical structure and corresponding plurality of individually spaced prismatic grooves and/or ridges. Hence, in an embodiment, the transparent optical structure may comprise an optical structure material, wherein the optical structure material may be one of: a glass, a plastic, a silicone, a resin, or a ceramic.

Similarly, a material may also be defined for the transparent envelope. Hence, in an embodiment, the transparent envelope comprises an envelope material, wherein the envelope material may be one of: a glass, a plastic, a silicone, a resin, or a ceramic. Said plastic may for example be poly (methyl methacrylate), also known as PMMA. Other similar transparent materials may also be envisioned as the optical structure material and/or the envelope material. Some examples may be provided wherein the optical structure material and the envelope material may be the same, or at least comprise a same crystal structure. Hence, in an embodiment, the transparent optical structure may be monolithic with the transparent envelope. Such an embodiment may be advantageous in manufacturing said transparent envelope provided with the transparent optical structure according to the invention.

In an embodiment, each LED filament of the at least one LED filament may comprise a luminance of at least 100 kcd/m$^2$. Because of the high luminance of the at least one LED filament, a relatively low prism area 'P' suffices to reduce glare, since a virtual image of the at least one LED filament at 10% or at even 1% of such brightness value of 100 kcd/m$^2$ may still be considered as a bright source (thereby distributing the emitted light from one LED filament partly to the virtual image and hence reducing the perception of glare). An additional benefit of a being able to implement a relatively low prism area 'P' is that the virtual image of the at least one LED filament becomes substantially invisible when the LED filament lamp is operationally in an off-state, which makes the appearance of the LED filament lamp according to the present invention substantially identical to other filament bulbs in an off-state, such as conventional bulbs.

In an embodiment, the LED filament lamp may comprise a symmetry axis, wherein the at least one LED filament extends longitudinally along said symmetry axis. Such a symmetry axis may be the centerline of a LED filament lamp, such as a LED bulb. Moreover, in an embodiment, the at least one LED filament may be substantially parallel to said symmetry axis. Such an embodiment ensures that the transparent optical structure itself is invisible as well. Substantially parallel may mean that the at least one LED filament may be tilted at a pitch less than 1 millimeter with respect to said symmetry axis, or alternatively may have an angle below 5 degrees with respect to said symmetry axis.

The transparent envelope may comprise a bulb shape, a cylindrical shape, at least partly a spherical shape, a tubular shape, a rectangular shape, and/or any other shape common to a lamp or light bulb in particular.

In aspects, the transparent optical structure may be provided to a surface area of the transparent envelope, which surface area is oriented towards a viewing direction of (a user towards) the LED filament lamp. For example, considering a classical bulb (shape), the transparent optical structure may be provided to the spherical surface area of the bulb envelope, while not being applied to the bottom neck part of the bulb envelope (which merges into the fitting of the bulb).

It is a further an object of the invention to provide an improved luminaire (or lighting system) according to the invention, which at least alleviates the problems and disadvantages mentioned above. Thereto, the invention further provides a luminaire comprising a socket and the LED filament lamp according to any one of the preceding claims, wherein the LED filament lamp is mounted in said socket. Thereby, advantages and/or embodiments applying to the LED filament lamp according to the invention may mutatis mutandis apply to said luminaire according to the invention.

It is a further an object of the invention to provide an improved method of providing a transparent optical structure to a transparent envelope of a LED filament lamp, which at least alleviates the problems and disadvantages mentioned above. Thereto, the invention provides a method of providing a transparent optical structure to a transparent envelope of a LED filament lamp comprising at least one LED filament enclosed by the transparent envelope, wherein the method comprises: coating an outer surface and/or an inner surface of the transparent envelope, by means of imprinting, etching or photolithography, with a plurality of individually spaced prismatic grooves and/or ridges that are at least partly aligned along a projection of the at least one LED filament on the transparent envelope; wherein each prismatic groove and/or ridge of the plurality of individually spaced prismatic grooves and/or ridges comprises a refractive facet oriented at a wedge angle between 5 and 50 degrees with a tangent of the envelope at the location of the respective prismatic groove and/or ridge. Thereby, advantages and/or embodiments applying to the LED filament lamp according to the invention may mutatis mutandis apply to said method according to the invention.

BRIEF DESCRIPTION OF THE DRAWINGS

The invention will now be further elucidated by means of the schematic non-limiting drawings:

FIGS. 2A, 2B & 2C depict schematically an embodiment of a LED filament lamp according to the invention, wherein FIG. 2C depicts a cross-sectional view of a transparent envelope provided with a transparent optical structure corresponding to the LED filament lamp of this embodiment;

DETAILED DESCRIPTION OF THE EMBODIMENTS

Figure 1A:
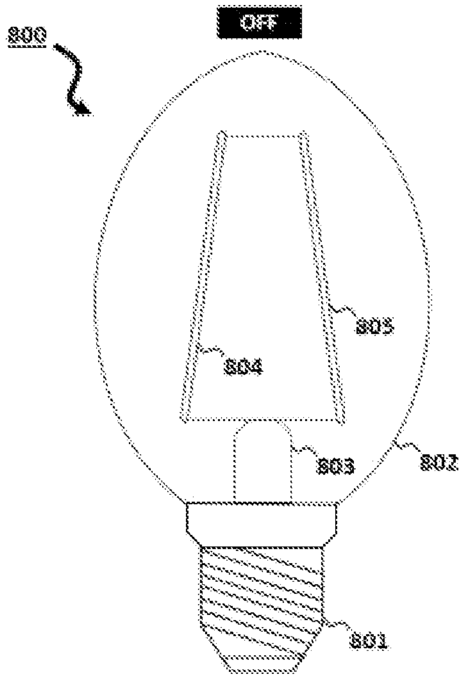
FIG.1A. Prior Art
FIGS. 1A & 1B depict schematically a LED filament lamp known in the art.

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

As mentioned before, because LED filament lamps resemble the appearance of an incandescent lamp but provide the benefits associated with LED lighting, incandescent lamps are increasingly being replaced by LED filament lamps. However, due to an ongoing trend to increase the light output of LED filaments mounted within such LED filament lamps, a LED filament lamp may produce an uncomfortable glare for a viewer. Reduction of such glare is often achieved by frosting or texturing an envelope of the LED filament lamp, so as to hide the filaments from direct view, but this solution takes away the very character of a LED filament lamp having a clear envelope and clearly visible LED filaments.

Figure 1B:
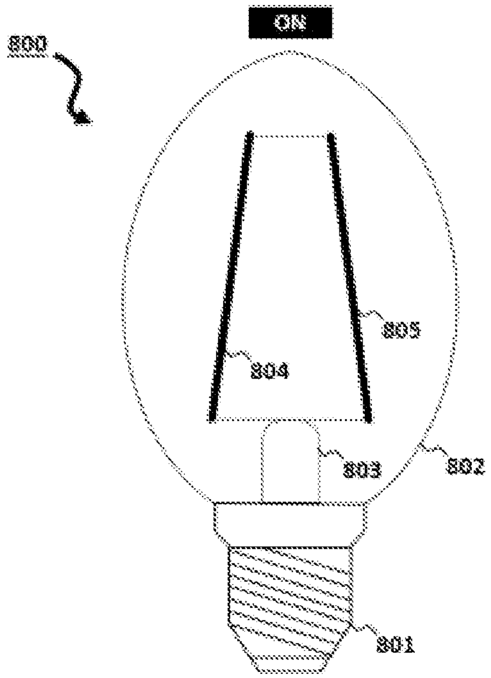
FIG.1B. Prior Art

FIGS. 1A & 1B depicts schematically a LED filament lamp 800 known in the art. The known LED filament lamp 800 comprises a fitting 801, a transparent envelope 802 made of glass, a stem 803 holding a first LED filament 804 and a second LED filament 805. Both LED filaments 804, 805 are visible through the transparent envelope. Though not depicted, the first and the second LED filament 804, 805 are operatively connected to a module comprising electrical wiring and/or a power supply. Mechanical structures for holding and/or mounting the LED filaments is not explicitly depicted, but known in the art.

Referring to FIG. 1A, the known LED filament lamp 800 in an off-state.

Referring to FIG. 1B, the known LED filament lamp 800 is in an on-state, wherein the LED filaments 804, 805 emit light. Each of the LED filaments 804, 805 comprises e.g. a filament luminance of 100 kdc/$m^2$. Due to the high lumen output of said filaments, the known LED filament lamp 800 causes glare when looking towards the transparent envelope 802 directly, which is known to be very uncomfortable and a technical disadvantage of such LED filament lamps 800 known in the art.

Figure 2A:
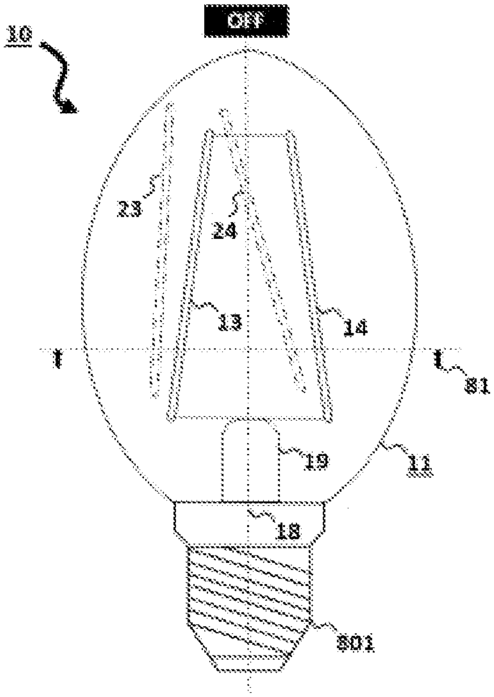
Figure 2B:
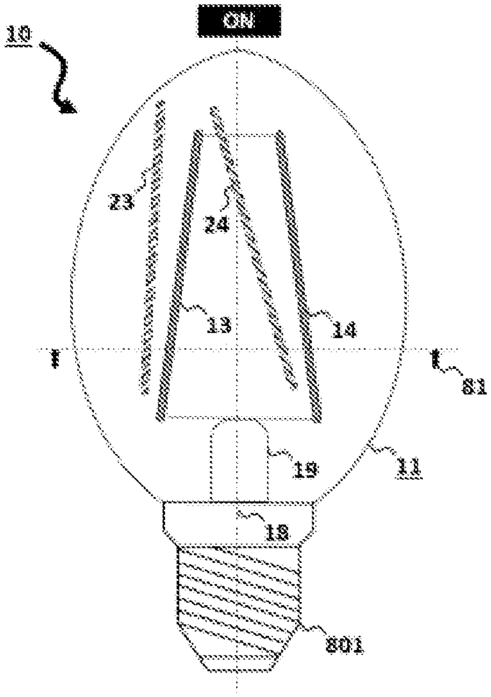

FIGS. 2A & 2B depict schematically an embodiment of a LED filament lamp 10 according to the invention. Referring to FIG. 2A, the LED filament lamp 10 in an off-state. Referring to FIG. 2B, the LED filament lamp 10 is in an on-state (hence emitting light).

The LED filament lamp 10 comprises a transparent envelope 11. The transparent envelope 11 is made of an envelope material being glass. Within the transparent envelope 11, the LED filament lamp 10 comprises a stem 19 holding a first LED filament 13 and a second LED filament 14. The first LED filament 13 and the second LED filament 14 extend longitudinally along the symmetry axis 18 of the LED filament lamp 10, wherein the first LED filament 13 and the second LED filament 14 taper inwards towards the top of the transparent envelope 11. Here, the first LED filament 13 and the second LED filament 14 each comprise a luminance of 100 kcd/$m^2$.

The transparent envelope may alternatively be made of another transparent material, such as a plastic, such as e.g. PMMA. The stem may alternatively be any other mechanical structure for holding LED filaments as known in the art. The LED filament lamp may alternatively comprise any other number of LED filaments, such as e.g. one, three or four. Furthermore: Alternatively, at least one LED filament may be substantially parallel to said symmetry axis. Yet alternatively, at least one LED filament may be perpendicular to said symmetry axis. Yet alternatively, at least one LED filament may helix or swirl around said symmetry axis.

Figure 2C:
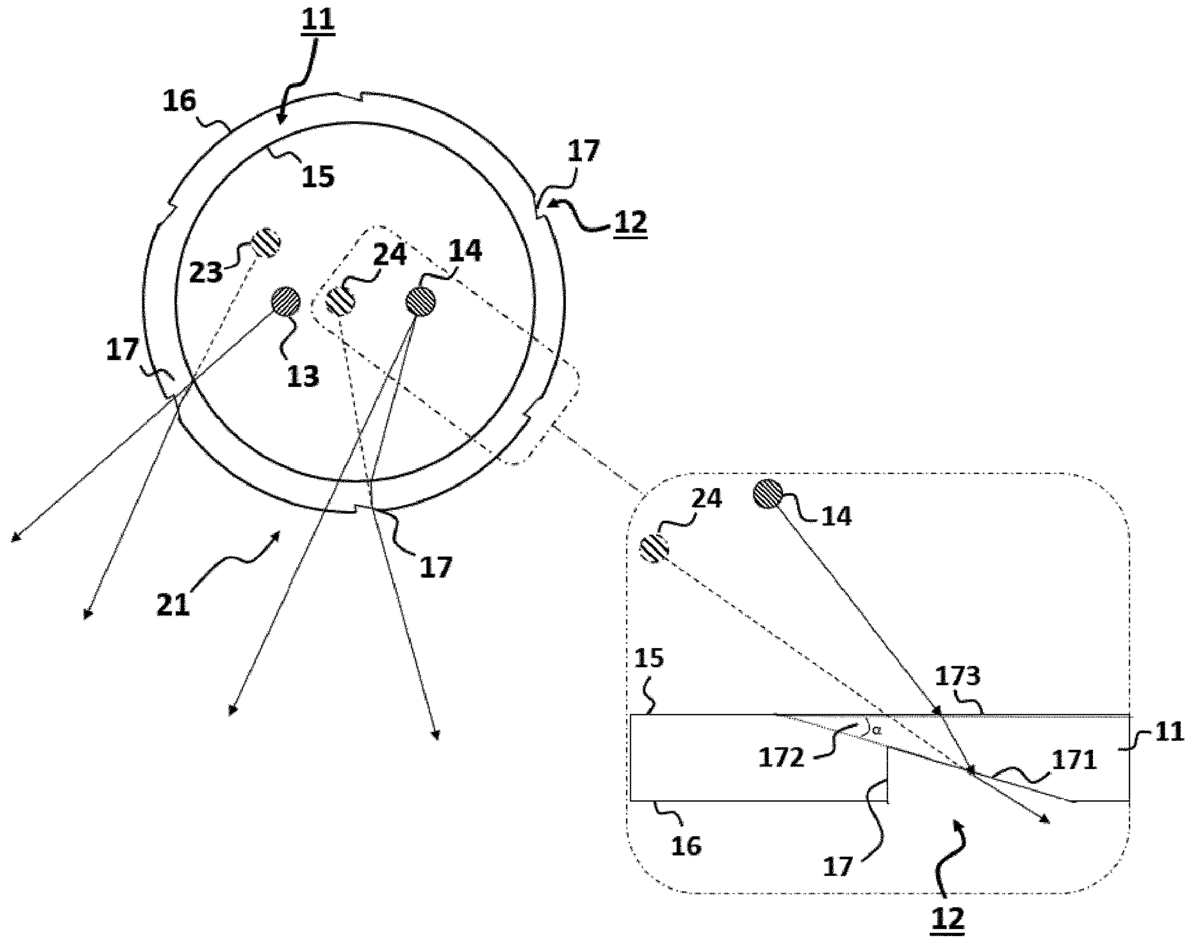

FIG. 2C depicts a cross-sectional view 81 of the transparent envelope 11 of the embodiment depicted in FIGS. 2A and 2B. Hence, still referring to FIG. 2A, 2B and in particular to FIG. 2C, the transparent envelope 11 comprises an inner envelope surface 15 and an outer envelope surface 16, wherein the transparent envelope 11 further comprises (or is provided with) a transparent optical structure 12.

Here, the transparent optical structure 12 is provided on the outer envelope surface 16. The transparent optical structure 12 comprises a plurality of individually spaced prismatic grooves 17. For example, said plurality of individually spaced prismatic grooves 17 may be manufactured on the outer envelope surface 16 via photolithography. The plurality of prismatic grooves 17 are thus individually spaced, and furthermore aligned along a projection of the first LED filament 13 and the second LED filament 14 on the transparent envelope 11 (in particular the outer envelope surface 15). Hence, schematically considering the two-dimensional (front) viewing plane of the present FIGS. 2A and 2B, the transparent optical structure 12 is aligned along the same contours as the first LED filament 13 and the second LED filament 14. FIG. 2C depicts six of such prismatic grooves 17. Due to their alignment and limited number, the transparent optical structure 12 covers less than a tenth of the transparent envelope 11.

Alternatively, said prismatic grooves may be individually spaced prismatic ridges, or a combination of individually spaced prismatic grooves and ridges. Moreover, in alternative embodiments, the transparent optical structure may cover less than half of the transparent envelope. Yet alternatively, in some embodiments, the individually spaced prismatic grooves may be distributed evenly along the circumference of the transparent envelope.

Still referring to FIG. 2C, the prismatic grooves 17 each constitute asymmetric prismatic grooves (i.e. having one slanted facet (i.e. referred to as the refractive facet) and one vertical facet perpendicular to the outer envelope surface 16). Thereby, each prismatic groove 17 comprises a refractive facet 171. The refractive facet 171 is oriented at a wedge angle 172 of thirty degrees with a tangent 173 of the envelope at the location of the respective prismatic groove. Said prismatic grooves 17 are thus refractive. Alternatively, said wedge angle may be between 5 and 50 degrees with a tangent of the envelope at the location of the respective prismatic groove and/or ridge.

Each asymmetrical individually spaced prismatic groove 17 will therefore render only one displaced virtual image of a corresponding LED filament. Consequently, due to the individually spaced refractive prismatic grooves 17, the transparent optical structure 12 refracts (or deflects) light emanating from the first LED filament 13 and the second LED filament 14 within the transparent envelope 11, and creates respectively a displaced first and second virtual image 23, 24 of the respective first LED filament 13 and the second LED filament 14 (when viewed). The LED filament lamp is in the on-state in FIG. 2C.

The brightness of the respective virtual images 23, 24 scales with the relative surface area of the respective facet of said prismatic groove 17. For example, when the distance of a LED filament to the prismatic groove is ten times the size of the refractive facet of the prismatic groove 17, the corresponding displaced virtual image of the LED filament is about a tenth of the brightness of the original (image of the) LED filament.

So, still referring to FIG. 2A, the LED filament lamp 10 in an off-state. The first LED filament 13 and the second LED filament 14 are clearly visible through the transparent envelope 11 provided with the transparent optical structure 12. Moreover, as mentioned, the transparent optical structure 12 creates a displaced first virtual image 23 of the first LED filament 13 and a second virtual image 24 of the second LED filament 14. However, in the off-state of the LED filament lamp 10, the virtual images 23, 24 of the respective two LED filaments 13, 14 are weak and are dominated by the normal image (i.e. the brightness of a LED filament in off-state is e.g. less than the background and therefore the virtual image thereof is not substantially visible in the off-state). Thus, when viewed in the off-state, the LED filament lamp 10 has (substantially) the same appearance as a LED filament lamp without the transparent optical structure (i.e. e.g. compare to known LED filament lamp depicted in FIG. 1A). The transparent optical structure 12 does therefore not substantially obtrude the appearance of the LED filaments 13, 14 in the transparent envelope 11.

However, when viewed in the on-state, two additional LED filaments 23, 24 become visible slightly displaced to the original LED filaments 13, 14, because the first virtual image 23 and the second virtual image 24 of the two respective LED filaments 13, 14 of the LED filament lamp appear due to the refraction caused by the transparent optical structure 12 comprising the plurality of asymmetric and individually spaced prismatic grooves 17. Although the brightness of said virtual images 23, 24 is less than the corresponding first and second LED filament 13, 14 (e.g. considering the example given above, only a tenth of the brightness of the original LED filament), said virtual images 23, 24 of the first and second LED filaments 13, 14 will still become brightly visible in the on-state, because the first LED filament 13 and the second LED filament 14 each comprise originally a luminance of 100 kcd/$m^2$ (hence the virtual images each comprising a luminance of 10 kcd/$m^2$ considering the example above). Therefore, the present invention is for example particularly advantageous for LED filament lamps having more and more an increasing lumen output.

All in all, the present invention provides a LED filament lamp 10, wherein the transparent optical structure 12 causes virtual images 23, 24 of the LED filaments 13, 14 to appear due to refraction, so as to distribute the brightness of the LED filaments 13, 14 over these virtual images 23, 24 and advantageously reduce glare, while still maintaining the characteristic appearance of a clear (transparent) LED filament bulb.

Figure 3A:
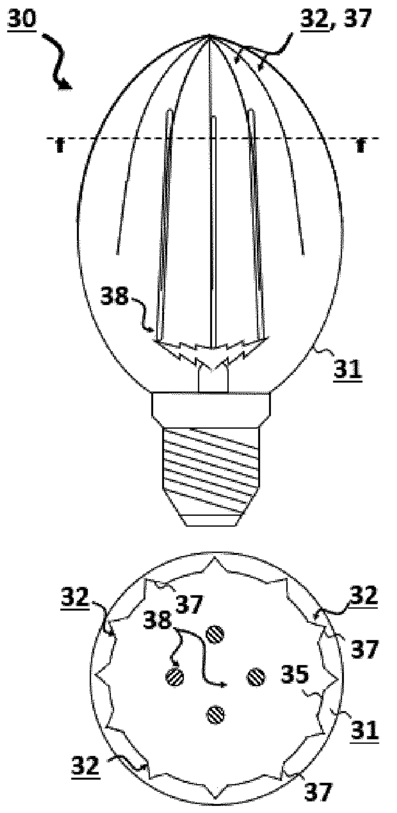
FIGS. 3A & 3B depict schematically multiple alternative embodiments of a transparent envelope provided with a transparent optical cover according to the invention.
Figure 3B:
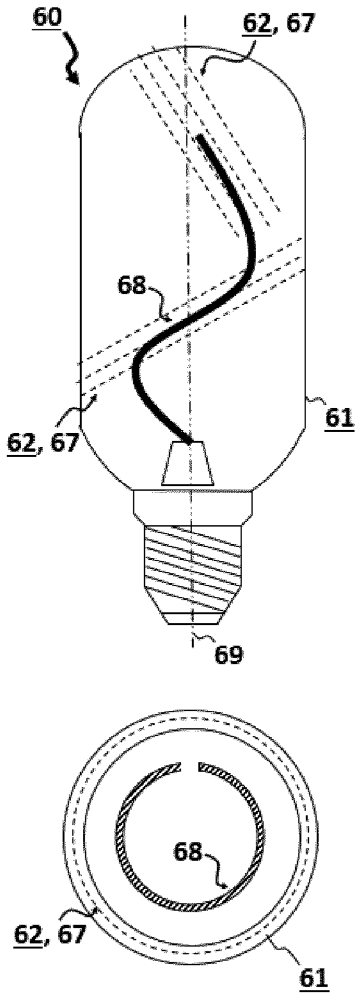

FIGS. 3A & 3B depict schematically some alternative embodiments of a LED filament lamp 30, 50 according to the invention. FIG. 3A-3B also depict the corresponding transparent envelope 31, 51 provided with the corresponding transparent optical structure 32, 52 according to the invention.

FIG. 3A depicts, by non-limiting example, an embodiment of a LED filament lamp 30. The LED filament lamp 30 is partly similar to the embodiment depicted in FIG. 2A-C, and therefore the effect of the invention and advantages of the embodiment depicted in FIG. 2A-C applies mutatis mutandis to the embodiment depicted in FIG. 3A.

Referring to FIG. 3A, the LED filament lamp 30 comprises a transparent envelope 31. Four LED filaments 38 are arranged within the transparent envelope 31. The transparent envelope 31 is provided with a transparent optical structure 32. The transparent optical structure 32 comprises a plurality of individually spaced and symmetrical prismatic grooves 37 that are partly aligned along a projection of the LED filaments 38 on the transparent envelope 31. Alternatively, said grooves may be ridges. More specifically: only the top part of the transparent envelope 31 is provided with the transparent optical structure 32, thereby covering less than halve of the transparent envelope 31 and advantageously rendering a clear view into the LED filament lamp 30.

Still referring to FIG. 3A, each prismatic groove 37 comprises a refractive facet, due to the symmetry here two refractive facets per prismatic groove 37. Said refractive facets are oriented at a wedge angle of fifty degrees with a tangent of the envelope at the location of the respective prismatic groove. Said prismatic grooves are thus refractive.

Alternatively, said wedge angle may be different for different grooves of the plurality of individually spaced and symmetrical prismatic grooves. The transparent optical structure 32 is provided on the inner envelope surface 35 of the transparent envelope 31, but may alternative be provided in the transparent envelope, i.e. between the inner envelope surface and an outer envelope surface. Such a structure may for example be 3D-printed when manufacturing the transparent envelope with 3D-printing technologies, or alternatively via 2K-injection molding. Here, the plurality of individually spaced and symmetrical prismatic grooves 37 are distributed evenly along the circumference of the transparent envelope 31.

FIG. 3B depicts, by non-limiting example, an embodiment of a LED filament lamp 60. The LED filament lamp 60 is partly similar to the embodiment depicted in FIG. 2A-C, and therefore the effect of the invention and advantages of the embodiment depicted in FIG. 2A-2C applies mutatis mutandis to the embodiment depicted in FIG. 3B.

Referring to FIG. 3B, the LED filament lamp 60 comprises a cylindrical transparent envelope 61. The LED filament lamp 60 comprises a single LED filament 68 within the cylindrical transparent envelope 61. The single LED filament 68 extends in the longitudinal direction of the cylindrical transparent envelope 61 of the LED filament lamp 60, but swirls around the symmetry axis 69 of the LED filament lamp 60, i.e. the centerline 69 of the cylindrical envelope 61. The transparent envelope 61 is provided with a transparent optical structure 62 according to the invention.

The transparent optical structure 62 comprises a plurality of individually spaced prismatic grooves 67 that are partly aligned along a projection of the LED filaments 68 on the transparent envelope 61. Said individually spaced prismatic grooves 67 are provided between the inner and the outer envelope surface of the transparent envelope 61. Here, only specific parts of the transparent envelope 61 (matching at least part of said projection) are provided with the transparent optical structure 62, thereby covering less than a tenth of the transparent envelope 61 and advantageously rendering a clear view into the LED filament lamp 60.

In an embodiment, not depicted, the invention provides a luminaire comprising a socket, wherein the LED filament lamp depicted in either FIG. 2, 3A or 3B is mounted to said socket. The luminaire thereby powers said LED filament lamp and controls said LED filament lamp. Such a socket may for example comprise a cable to mount the socket to a ceiling, so as to achieve a hanging LED filament lamp.

Figure 4:
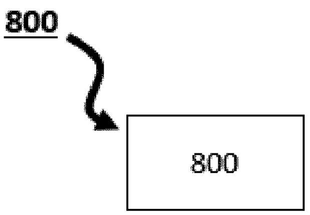
FIG. 4 depicts schematically an embodiment of a method according to the invention.

FIG. 4 depicts schematically, by non-limiting example, a method 800 of providing a transparent optical structure to a transparent envelope of a LED filament lamp according to the invention. The method comprises the step 801 of coating an inner surface of a transparent envelope, by means of photolithography with a plurality of individually spaced prismatic grooves that are at least partly aligned along a projection of at least one LED filament on the transparent envelope; wherein each prismatic groove of the plurality of individually spaced prismatic grooves comprises a refractive facet oriented at a wedge angle between 5 and 50 degrees with a tangent of the envelope at the location of the respective prismatic groove and/or ridge.

Alternatively, or additionally, said individually spaced prismatic grooves may also comprise individually spaced prismatic ridges. Alternatively, said inner surface may be an outer surface, or an area in between an inner surface and the outer surface of the transparent envelope. Alternatively, said photolithography may be replaced by etching and/or imprinting, such as 3D printing, or injection molding.

The invention claimed is:

1. A LED filament lamp comprising:

a transparent envelope provided with a transparent optical structure;

at least one LED filament enclosed by the transparent envelope;

wherein the transparent optical structure comprises a plurality of individually spaced prismatic grooves and/or ridges that are at least partly aligned along a projection of the at least one LED filament on the transparent envelope;

wherein each prismatic groove and/or ridge of the plurality of individually spaced prismatic grooves and/or ridges comprises a refractive facet oriented at a wedge angle between 5 and 50 degrees with a tangent of the envelope at the location of the respective prismatic groove and/or ridge.

2. The LED filament lamp according to claim 1, wherein the wedge angle is between 10 and 40 degrees.

3. The LED filament lamp according to claim 1, wherein at least two of the plurality of individually spaced prismatic grooves and/or ridges comprise a different wedge angle.

4. The LED filament lamp according to claim 1, wherein the transparent optical structure covers less than half of the transparent envelope, less than a third of the transparent envelope, or less than a tenth of the transparent envelope.

5. The LED filament lamp according to claim 1, wherein the plurality of prismatic grooves and/or ridges are individually spaced with a fixed pitch;

wherein said fixed pitch is defined as the shortest distance along the envelope between neighboring tops of the plurality of individually spaced prismatic grooves and/or ridges.

6. The LED filament lamp according to claim 1, wherein each prismatic groove and/or ridge of the plurality of individually spaced prismatic grooves and/or ridges comprises an equal base width.

7. The LED filament lamp according to claim 6, wherein the plurality of prismatic grooves and/or ridges are individually spaced with a fixed pitch equal to one of: at least two times the equal base width, at least three times the equal base width, at least four times the equal base width, at least five times the equal base width, or at least ten times the equal base width;

wherein said fixed pitch is defined as the shortest distance along the envelope between neighboring tops of the plurality of individually spaced prismatic grooves and/or ridges.

8. The LED filament lamp according to claim 1, wherein the transparent envelope comprises an inner envelope surface and an outer envelope surface, wherein the transparent optical structure is provided on the inner envelope surface, on the outer envelope surface, and/or between the inner envelope surface and the outer envelope surface.

9. The LED filament lamp according to claim 1, wherein the plurality of individually spaced prismatic grooves and/or ridges are distributed evenly along a circumference of the transparent envelope.

10. The LED filament lamp according to claim 1, wherein the transparent optical structure comprises an optical structure material, wherein the optical structure material is one of: a glass, a plastic, a silicone, a resin, or a ceramic.

11. The LED filament lamp according to claim 1, wherein each LED filament of the at least one LED filament comprises a luminance of at least 100 $kcd/m^2$.

12. The LED filament lamp according to claim 1, wherein the LED filament lamp comprises a symmetry axis, wherein the at least one LED filament extends longitudinally along said symmetry axis.

13. The LED filament lamp according to claim 12, wherein the at least one LED filament is substantially parallel to said symmetry axis.

14. A luminaire comprising a socket and the LED filament lamp according to claim 1, wherein the LED filament lamp is mounted in said socket.

15. A method of providing a transparent optical structure to a transparent envelope of a LED filament lamp comprising at least one LED filament enclosed by the transparent envelope, wherein the method comprises:

coating an outer surface and/or an inner surface of the transparent envelope, by means of imprinting, etching or photolithography, with a plurality of individually spaced prismatic grooves and/or ridges that are at least partly aligned along a projection of the at least one LED filament on the transparent envelope;

wherein each prismatic groove and/or ridge of the plurality of individually spaced prismatic grooves and/or ridges comprises a refractive facet oriented at a wedge angle between 5 and 50 degrees with a tangent of the envelope at the location of the respective prismatic groove and/or ridge.

* * * * *